(12) United States Patent
Nieda et al.

(10) Patent No.: US 12,493,021 B2
(45) Date of Patent: Dec. 9, 2025

(54) INSPECTION APPARATUS

(71) Applicant: SHIMADZU CORPORATION, Kyoto (JP)

(72) Inventors: Yoshiaki Nieda, Kyoto (JP); Yuichi Masuda, Kyoto (JP); Masahito Yahata, Kyoto (JP); Tatsuya Kataoka, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 421 days.

(21) Appl. No.: 18/021,865

(22) PCT Filed: May 6, 2021

(86) PCT No.: PCT/JP2021/017324
§ 371 (c)(1),
(2) Date: Jun. 30, 2023

(87) PCT Pub. No.: WO2022/038837
PCT Pub. Date: Feb. 24, 2022

(65) Prior Publication Data
US 2024/0011960 A1  Jan. 11, 2024

(30) Foreign Application Priority Data
Aug. 20, 2020 (JP) .................. 2020-139351

(51) Int. Cl.
*G01N 33/00* (2006.01)
(52) U.S. Cl.
CPC ..... *G01N 33/0013* (2013.01); *G01N 33/0032* (2013.01)

(58) Field of Classification Search
None
See application file for complete search history.

(56) References Cited

U.S. PATENT DOCUMENTS

2020/0207643 A1  7/2020  Yahata et al.

FOREIGN PATENT DOCUMENTS

| | | | |
|---|---|---|---|
| EP | 1601003 A2 * | 11/2005 | ............ B65D 85/52 |
| JP | 2001-249140 A | 9/2001 | |
| JP | 2007-323995 A | 12/2007 | |
| JP | 2018-55965 A | 4/2018 | |
| WO | 2018/235865 A1 | 12/2018 | |

OTHER PUBLICATIONS

International Search Report for PCT/JP2021/017324 dated Jun. 8, 2021.
Written Opinion for PCT/JP2021/017324 dated Jun. 8, 2021.

* cited by examiner

*Primary Examiner* — Daniel S Larkin
(74) *Attorney, Agent, or Firm* — Sughrue Mion, PLLC (57) ABSTRACT

An ultraviolet ray emitter includes an inner tube, an outer tube arranged around the inner tube, the outer tube defining between the outer tube and the inner tube, a discharge space where discharge gas is sealed, a pair of electrodes that causes discharge in the discharge space, and an auxiliary light source that assists excitation of discharge gas by emitting light to discharge gas from the outside of the outer tube. The outer tube is less likely to allow passage therethrough of ultraviolet light generated by excitation of discharge gas than the inner tube but allows passage therethrough of light having a wavelength emitted from the auxiliary light source.

12 Claims, 7 Drawing Sheets

INSPECTION APPARATUS

CROSS REFERENCE TO RELATED APPLICATIONS

This application is a National Stage of International Application No. PCT/JP2021/017324 filed May 6, 2021, claiming priority based on Japanese Patent Application No. 2020-139351 filed Aug. 20, 2020.

TECHNICAL FIELD

The present disclosure relates to an inspection apparatus that inspects sample water.

BACKGROUND ART

Ultraviolet rays may be used for inspection of sample water. For example, ultraviolet rays may directly be emitted to sample water in order to oxidize an object to be inspected in sample water, or may be emitted to gas containing oxygen in order to generate ozone for oxidizing an object to be inspected in sample water.

Japanese Patent Laying-Open No. 2018-55965 (PTL 1) discloses an excimer lamp as an apparatus that generates ultraviolet rays. The excimer lamp disclosed in PTL 1 includes a starting aid light source that emits ultraviolet rays to discharge gas sealed in a discharge container, a part of the discharge container being exposed to the starting aid light source without being covered with a cladding tube.

CITATION LIST

Patent Literature

PTL 1: Japanese Patent Laying-Open No. 2018-55965

SUMMARY OF INVENTION

Technical Problem

The excimer lamp disclosed in PTL 1 is improved in turn-on and start capability by including the starting aid light source. According to the disclosure in PTL 1, since ultraviolet rays from the excimer lamp are radiated from an exposed portion without being covered with the cladding tube, a distance between an ultraviolet ray radiation surface of the starting aid light source and an ultraviolet ray radiation surface of the excimer lamp should be set to a distance sufficient to substantially prevent ultraviolet rays from the excimer lamp from reaching the starting aid light source, in order to prevent deterioration of the starting aid light source as a result of irradiation thereof with ultraviolet rays from the excimer lamp.

When the discharge container is arranged in an atmosphere containing oxygen, ozone harmful for a human body is generated by ultraviolet rays from the excimer lamp radiated from the exposed portion without being covered with the cladding tube. Therefore, in the use of the excimer lamp disclosed in PTL 1, the excimer lamp should be arranged in an atmosphere from which oxygen has been removed, or a treatment chamber where the excimer lamp is arranged should be purged with inert gas, such as nitrogen.

When an attempt to ensure turn-on and start capability by assisted excitation of discharge gas is made as set forth above, the excimer lamp should be designed in consideration of a problem caused thereby, that is, ultraviolet rays derived from discharge gas.

One object of the present disclosure is to solve the problem caused by ultraviolet rays derived from discharge gas while excitation of discharge gas is assisted.

Solution to Problem

An inspection apparatus in the present disclosure is an inspection apparatus that inspects sample water, and includes an ultraviolet ray emitter and a detector that detects a subject component contained in the sample water. The ultraviolet ray emitter includes an inner tube, an outer tube arranged around the inner tube, the outer tube defining between the outer tube and the inner tube, a discharge space where discharge gas is sealed, a pair of electrodes that causes discharge in the discharge space, and an auxiliary light source that assists excitation of the discharge gas by emitting light to the discharge space from the outside of the outer tube. The auxiliary light source can emit light longer in wavelength than ultraviolet light generated by excitation of the discharge gas, and the outer tube is less likely to allow passage therethrough of the ultraviolet light than the inner tube, but allows passage therethrough of light having the wavelength emitted from the auxiliary light source.

Advantageous Effects of Invention

According to the present disclosure, ultraviolet light generated by excitation of discharge gas is less likely to be emitted from the inside of the discharge space toward the outside of the outer tube but light from the auxiliary light source that assists excitation of discharge gas is emitted from the outside of the outer tube into the discharge space. Therefore, the inspection apparatus according to the present disclosure can solve the problem caused by ultraviolet rays derived from discharge gas while it assists excitation of discharge gas.

DESCRIPTION OF EMBODIMENTS

An embodiment of the present disclosure will be described in detail below with reference to the drawings.

The same or corresponding elements in the drawings have the same reference characters allotted and description thereof will not be repeated.

<Overall Configuration of Inspection Apparatus>

Figure 1:
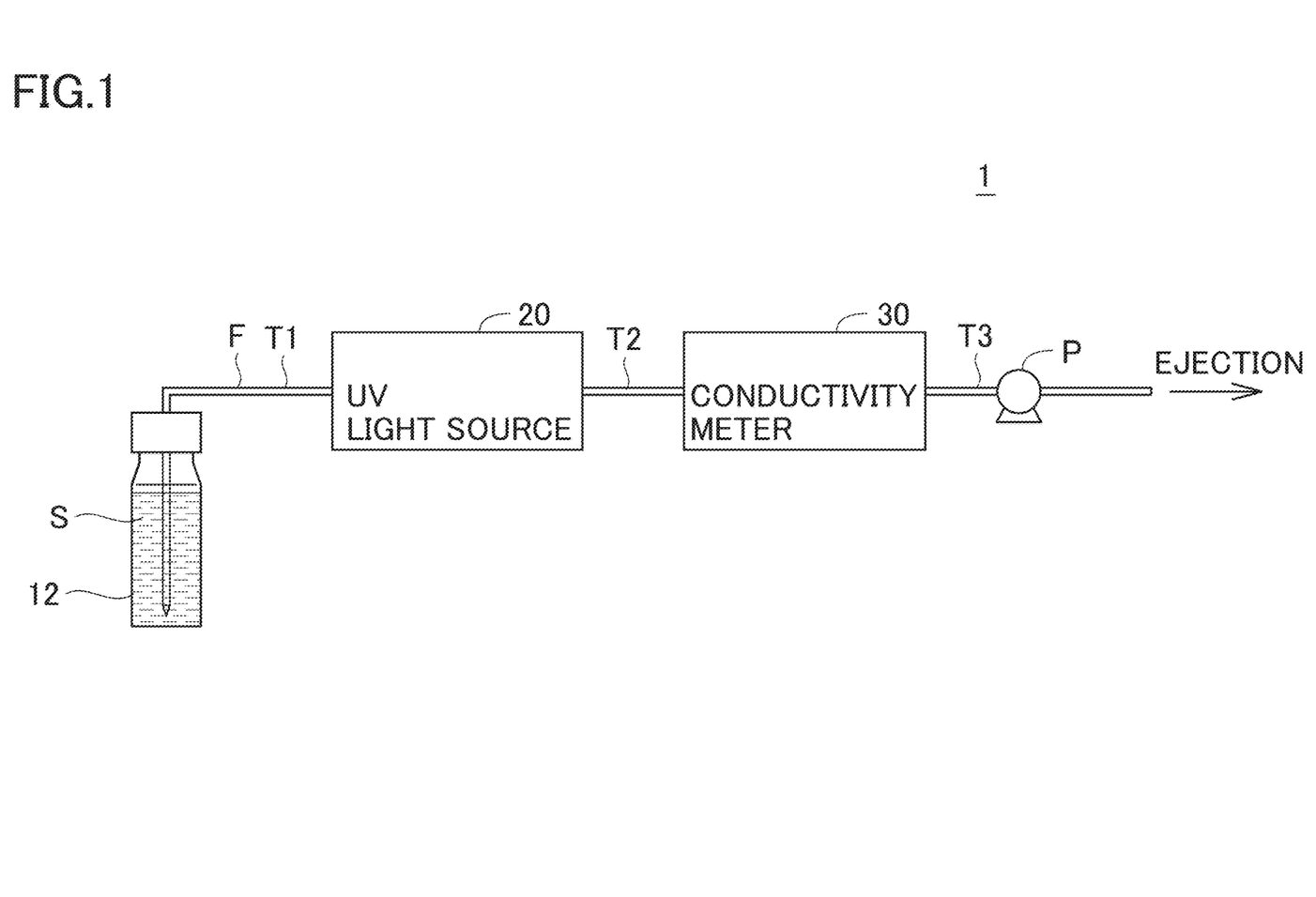
FIG. 1 is a schematic diagram showing an overall configuration of an inspection apparatus 1 according to the present embodiment.

FIG. 1 is a schematic diagram showing an overall configuration of an inspection apparatus 1 according to the present embodiment. Inspection apparatus 1 is an apparatus that measures an amount of TOC (a concentration of TOC) in sample water. Inspection apparatus 1 is what is called a wet oxidation inspection apparatus that oxidizes an organic substance in sample water by emission of ultraviolet rays to sample water.

Referring to FIG. 1, inspection apparatus 1 includes a liquid sending portion 10, an ultraviolet ray emitter 20, and a detector 30. Liquid sending portion 10 sends sample water S to be subjected to measurement to a flow channel F in inspection apparatus 1. More specifically, liquid sending portion 10 draws sample water S in a vial 12 by means of a pump P to send sample water S to flow channel F. Though pump P is arranged on a flow channel downstream from detector 30 in an example shown in FIG. 1, it may be arranged anywhere on flow channel F without being limited.

Ultraviolet ray emitter 20 is an apparatus that generates ultraviolet rays, and it is an excimer lamp. In the present embodiment, ultraviolet ray emitter 20 emits ultraviolet rays to sample water S. Details of ultraviolet ray emitter 20 will be described later. Vial 12 and ultraviolet ray emitter 20 are connected to each other through a tube T1 that defines flow channel F. Tube T1 represents an exemplary flow-in tube through which sample water S flows into ultraviolet ray emitter 20.

Detector 30 detects a subject component in sample water S. In the present embodiment, an object to be detected by detector 30 is a decomposed product produced as a result of oxidation by irradiation with ultraviolet rays. Detector 30 detects a decomposed product produced as a result of oxidation by ultraviolet rays, by measuring a conductivity of sample water S. When an organic substance in sample water S is oxidized by ultraviolet rays, it is finally decomposed into water and carbon dioxide. As carbon dioxide which is the decomposed product is dissolved in water, ions are produced and the conductivity of sample water S varies. Detector 30 according to the present embodiment detects the decomposed product in sample water S by measuring the conductivity varied by carbon dioxide which is the decomposed product. Though detector 30 detects carbon dioxide which is the decomposed product by measuring the conductivity in the present embodiment, a method of detecting a decomposed product is not limited to that method.

Ultraviolet ray emitter 20 and detector 30 are connected to each other through a tube T2 that defines flow channel F. Tube T2 represents an exemplary flow-out tube through which sample water S oxidized by irradiation with ultraviolet rays flows out of ultraviolet ray emitter 20.

Pump P is connected on a downstream side of detector 30 through a tube T3. Sample water S is sent by pump P from the inside of vial 12 toward ultraviolet ray emitter 20 and detector 30 and ejected.

[Configuration of Ultraviolet Ray Emitter 20]

Figure 2:
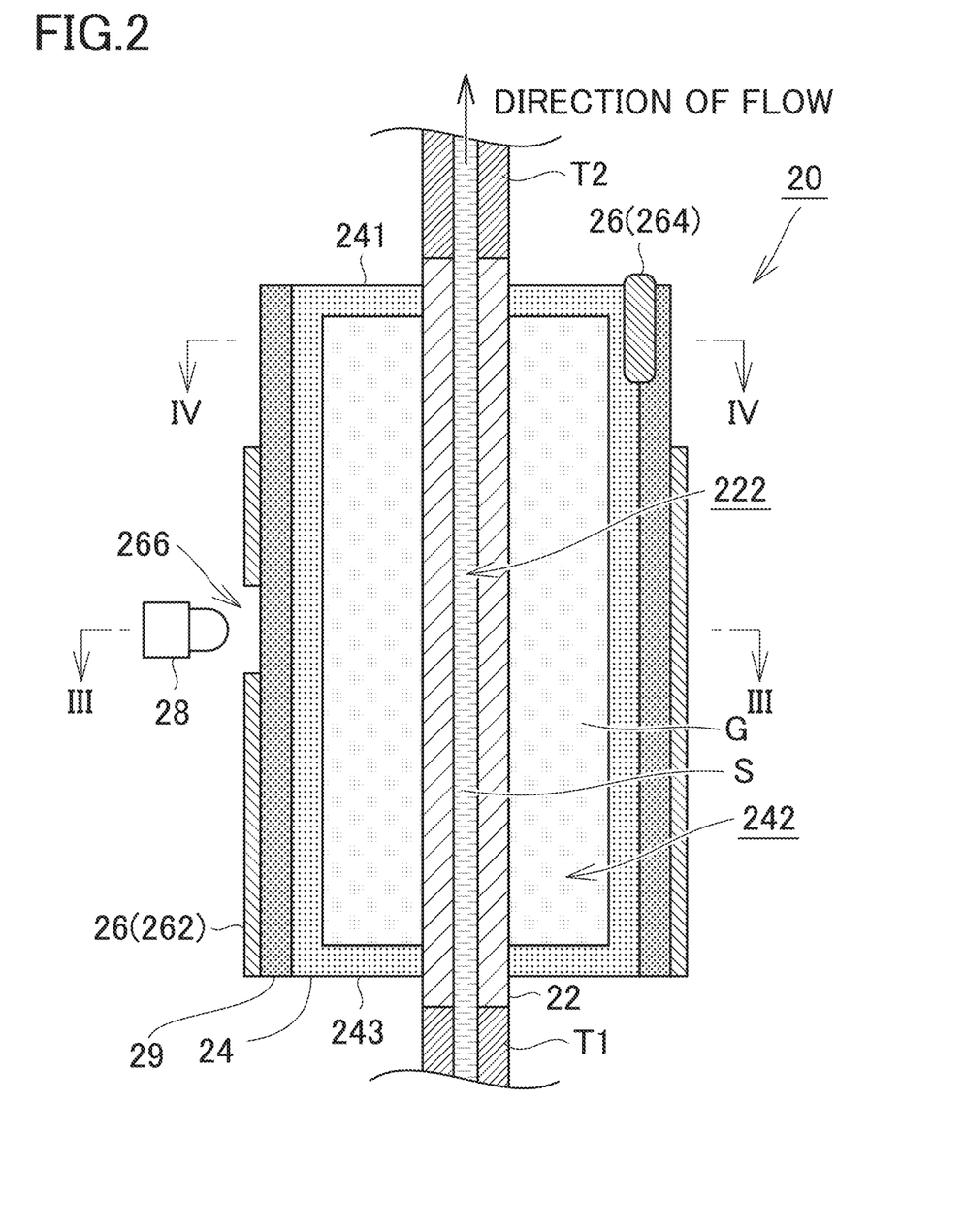
FIG. 2 is a schematic cross-sectional view showing a structure of an ultraviolet ray emitter 20.
Figure 3:
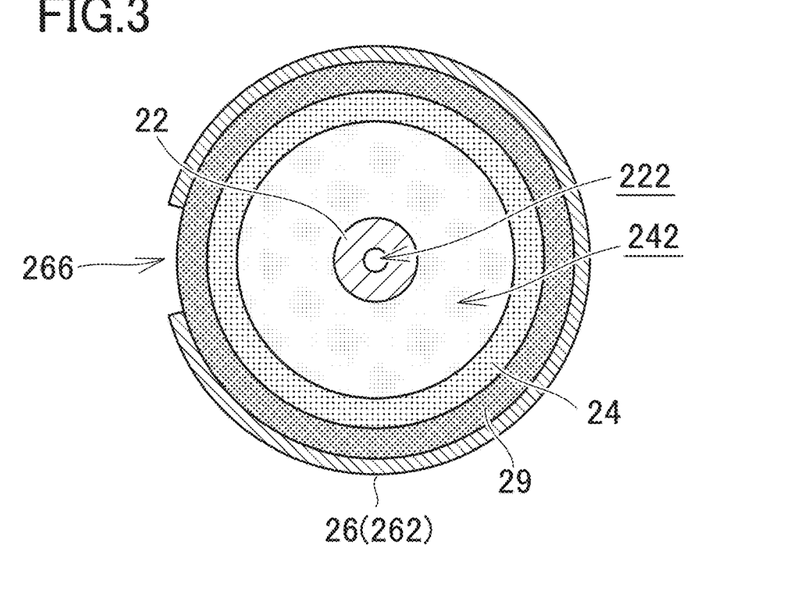
FIG. 3 is a schematic cross-sectional view along the line III-III, of ultraviolet ray emitter 20 in FIG. 2.
Figure 4:
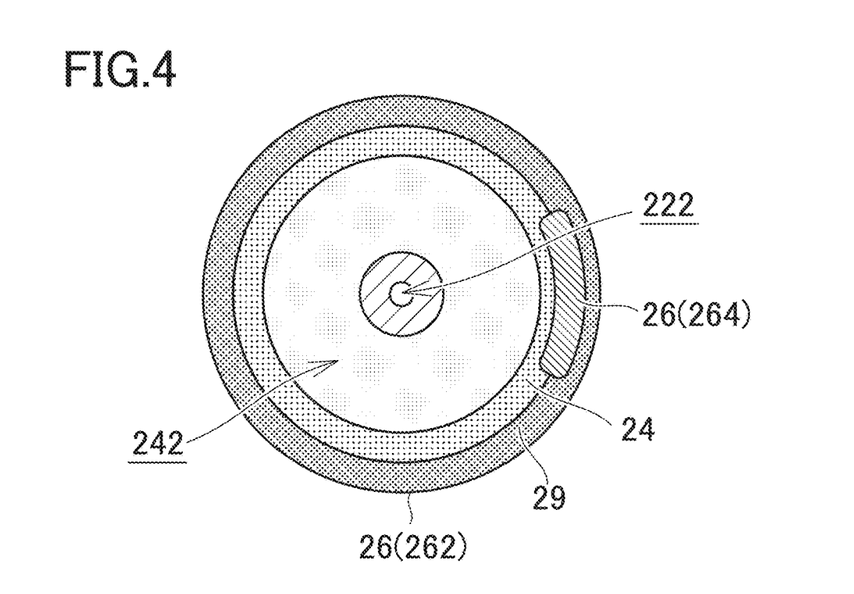
FIG. 4 is a schematic cross-sectional view along the line IV-IV, of ultraviolet ray emitter 20 in FIG. 2.

Ultraviolet ray emitter 20 will be described in detail with reference to FIGS. 2 to 4. FIG. 2 is a schematic cross-sectional view showing a structure of ultraviolet ray emitter 20. FIG. 3 is a schematic cross-sectional view along the line III-III of ultraviolet ray emitter 20 in FIG. 2. FIG. 4 is a schematic cross-sectional view along the line IV-IV of ultraviolet ray emitter 20 in FIG. 2.

Referring to FIG. 2, ultraviolet ray emitter 20 includes an inner tube 22, an outer tube 24, an electrode 26, an auxiliary light source 28, and a cladding tube 29.

Inner tube 22 is constructed such that an object to be irradiated with ultraviolet rays passes through an interior space 222. In the present embodiment, inner tube 22 is connected to tube T1 that falls under the flow-in tube and tube T2 that falls under the flow-out tube and sample water S passes through interior space 222 in inner tube 22. Inner tube 22 is formed into an elongated cylindrical shape (see FIGS. 3 and 4).

Outer tube 24 is arranged around inner tube 22. More specifically, outer tube 24 is arranged to surround inner tube 22 at a distance on the outside of inner tube 22. Outer tube 24 is formed into an elongated cylindrical shape. A central axial line of outer tube 24 coincides with a central axial line of inner tube 22. In other words, outer tube 24 is arranged concentrically with inner tube 22 (see FIGS. 3 and 4).

Figure 6:
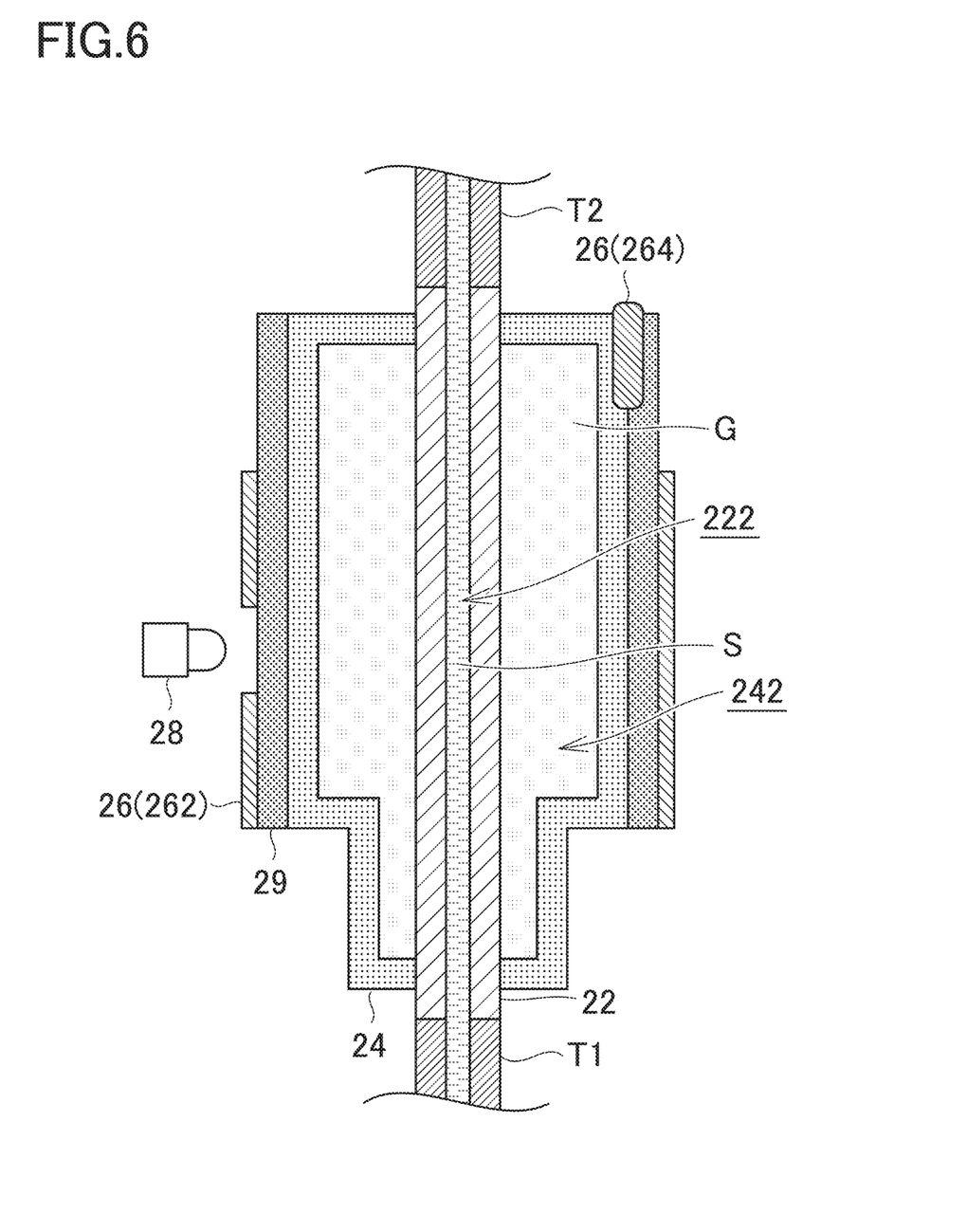
FIG. 6 is a schematic cross-sectional view showing a structure of an ultraviolet ray emitter according to a modification.

Though inner tube 22 and outer tube 24 are defined as being formed into a cylindrical shape, they should only be formed as being hollow. For example, one or both of inner tube 22 and outer tube 24 may be in such a shape that two hollow members different in diameter are connected to each other. Though inner tube 22 and outer tube 24 are defined as being concentrically arranged, central axes thereof do not have to coincide with each other. For example, FIG. 6 is a schematic cross-sectional view showing a structure of an ultraviolet ray emitter according to a modification. As shown in FIG. 6, outer tube 24 may be in such a shape that two hollow members different in diameter are connected to each other.

Outer tube 24 has an end surface 241 connected to a side surface of inner tube 22. Similarly, outer tube 24 has an end surface 243 connected to the side surface of inner tube 22. In the present embodiment, inner tube 22 is longer in length in a longitudinal direction than outer tube 24. Therefore, each of end surfaces 241 and 243 of outer tube 24 is connected to the side surface of inner tube 22. The length in the longitudinal direction of inner tube 22 may be identical to or shorter than the length in the longitudinal direction of outer tube 24, so that each of end surfaces 241 and 243 of outer tube 24 is connected to an end of inner tube 22.

According to such a construction, in ultraviolet ray emitter 20, a discharge space 242 is provided between inner tube 22 and outer tube 24. Discharge gas G is sealed in discharge space 242. Not only noble gas, such as argon (Ar), krypton (Kr), or xenon (Xe), but also a gas mixture of noble gas and halogen gas, such as argon fluoride (ArF), krypton fluoride (KrF), krypton chloride (ClKr), or xenon chloride (ClXe), can be adopted as discharge gas. In the present embodiment, description will be given on the assumption that Xe is adopted as discharge gas G.

Electrode 26 is constituted of an outer electrode 262 and an inner electrode 264. Outer electrode 262 and inner electrode 264 are each arranged on an outer circumference of outer tube 24 with cladding tube 29 arranged on the outer circumference of outer tube 24 being interposed. In other words, outer electrode 262 is arranged on the outer circumference of cladding tube 29 and inner electrode 264 is arranged between cladding tube 29 and outer tube 24.

According to such a construction, in ultraviolet ray emitter 20, as a voltage is applied across outer electrode 262 and inner electrode 264, discharge occurs in discharge space 242. As a result of this discharge, discharge gas G in discharge space 242 is excited and enters an excimer state. When this excimer state returns to an original state (a base state), light is emitted. Of this light (ultraviolet light), light that travels radially inward is emitted to an object (sample water S in the present embodiment) to be irradiated with ultraviolet rays that passes through interior space 222 in inner tube 22. In other words, ultraviolet ray emitter 20 is a double-wall excimer lamp and emits ultraviolet rays from discharge space 242 toward interior space 222 in inner tube 22 arranged along the longitudinal direction of the excimer lamp.

Outer electrode 262 is provided with an opening 266. Auxiliary light source 28 is arranged in opening 266 on the outside of outer tube 24 such that an emission surface of auxiliary light source 28 faces cladding tube 29. Auxiliary light source 28 emits light toward discharge gas G in discharge space 242 from the outside of outer tube 24.

Once discharge gas G is excited to enter the excimer state, as a result of light emission that occurs when it returns from the excimer state to the base state and discharge within discharge space 242, it can thereafter enter again the excimer state. In order to set discharge gas G to the excimer state while discharge gas G is in the base state, however, a high voltage is required. In the present embodiment, emission of light from auxiliary light source 28 into discharge space 242 can assist start of light emission.

Light generated when discharge gas G returns from the excimer state to the base state and light emitted from auxiliary light source 28 will be described. A peak wavelength of light generated when discharge gas G returns from the excimer state to the base state is different depending on a type of discharge gas G. For example, the peak wavelengths of Ar, Kr, Xe, ArF, KrF, ClKr, and ClXe are 126 nm, 146 nm, 172 nm, 193 nm, 248 nm, 222 nm, and 308 nm, respectively. In other words, light generated when discharge gas G returns from the excimer state to the base state is ultraviolet light. Light generated when discharge gas G returns from the excimer state to the base state is also simply referred to as ultraviolet light.

Auxiliary light source 28 can emit light longer in wavelength than ultraviolet light generated in discharge space 242. For example, auxiliary light source 28 can emit visible light, and emits light around 400 nm.

[Characteristics of Inner Tube 22 and Outer Tube 24]

Figure 5:
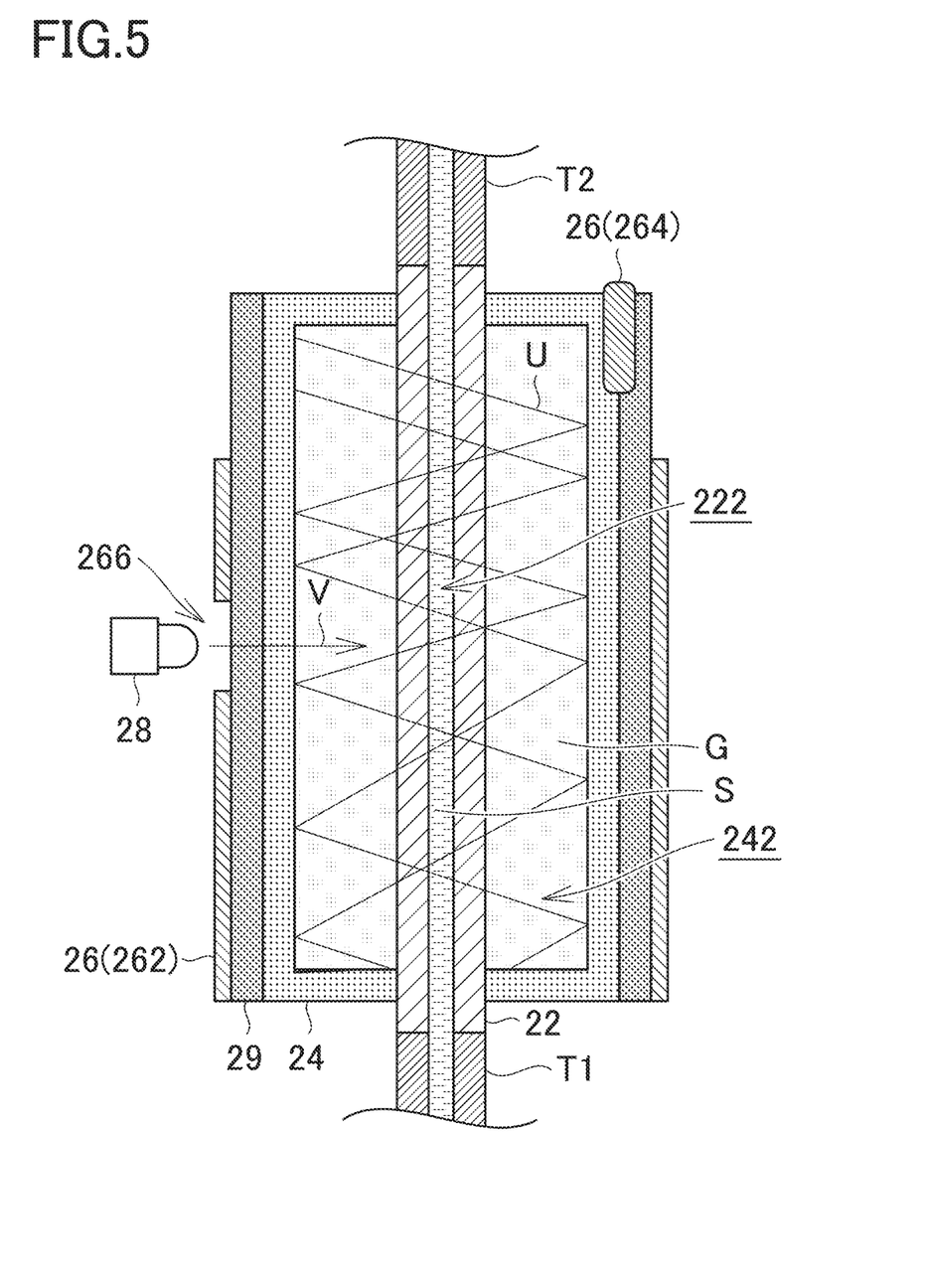
FIG. 5 is a conceptual diagram showing movement of ultraviolet light generated in a discharge space 242 and light from an auxiliary light source 28.

Characteristics of inner tube 22 and outer tube 24 will be described with reference to FIG. 5. FIG. 5 is a conceptual diagram showing movement of ultraviolet light generated in discharge space 242 and light from auxiliary light source 28.

Inner tube 22 has such a property that ultraviolet light U generated in discharge space 242 passes therethrough. Specifically, light equal to or shorter than 200 nm passes through inner tube 22. Inner tube 22 is composed, for example, of quartz glass having few lattice defects and being high in purity.

Outer tube 24 has such a property that ultraviolet light U generated in discharge space 242 is less likely to pass therethrough whereas light emitted from auxiliary light source 28 passes therethrough. Specifically, light equal to or shorter than 200 nm is less likely to pass through outer tube 24. Outer tube 24 is composed, for example, of quartz glass containing an impurity and lattice defects.

According to such a construction, ultraviolet light U generated in discharge space 242 passes through inner tube 22 and is emitted to sample water S in interior space 222, whereas it is not emitted to the outside of outer tube 24. Light V from auxiliary light source 28 is emitted from the outside of outer tube 24 into discharge space 242.

Consequently, while start of light emission is assisted by emission from the outside of outer tube 24, of light that assists light emission within discharge space 242, a problem caused by ultraviolet light U short in wavelength that is derived from discharge gas G in discharge space 242 can be solved. Specifically, generation of ozone by ultraviolet light U short in wavelength that is derived from discharge gas G can be prevented, and deterioration of auxiliary light source 28 due to irradiation of auxiliary light source 28 with ultraviolet light U short in wavelength that is derived from discharge gas G can be prevented.

As a result of successful prevention of generation of ozone, an apparatus provided in consideration of generation of ozone (for example, a purging apparatus) is not required and a vacuum state in consideration of generation of ozone does not have to be set around ultraviolet ray emitter 20. The apparatus can be reduced in size or cost required for manufacturing of the apparatus can be reduced.

Since deterioration of auxiliary light source 28 due to ultraviolet light U derived from discharge gas G does not have to be taken into consideration, auxiliary light source 28 can be provided as being proximate to cladding tube 29 (outer tube 24) and the apparatus can be reduced in size.

Though cladding tube 29 may be composed of a material different in property from a material for outer tube 24, it is preferably composed of a material the same as that for outer tube 24, from a point of view of ease in welding.

Welding between outer tube 24 and inner tube 22 is welding between materials different in type from each other, and hence the welding is difficult. As outer tube 24 and inner tube 22 are composed of materials different in type, however, the problem caused by ultraviolet light U short in wavelength that is derived from discharge gas G in discharge space 242 can be solved while start of light emission is assisted.

[Modification]

Figure 7:
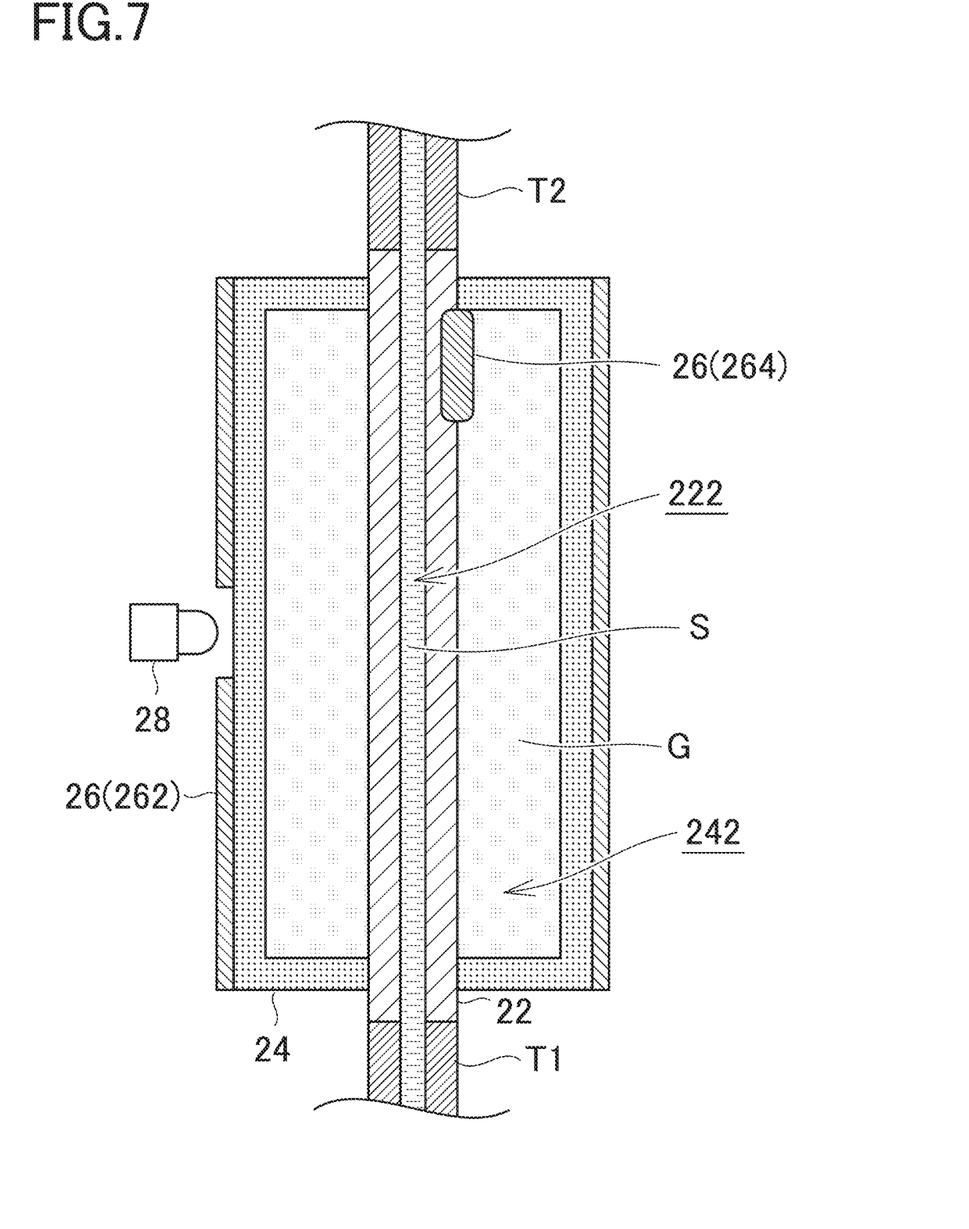
FIG. 7 is a schematic cross-sectional view showing a structure of an ultraviolet ray emitter according to a modification.

FIG. 7 is a schematic cross-sectional view showing a structure of an ultraviolet ray emitter according to a modification. The ultraviolet ray emitter according to the modification is different from ultraviolet ray emitter 20 (see FIG. 2) according to the embodiment in not including cladding tube 29 and in positions where outer electrode 262 and inner electrode 264 are provided.

Though outer electrode 262 and inner electrode 264 are both provided on the outside of outer tube 24 in the embodiment, inner electrode 264 may be provided in inner tube 22 as shown in FIG. 7. In this case, cladding tube 29 does not have to be provided.

By providing outer electrode 262 and inner electrode 264 on the outside, there is nothing (inner electrode 264) to block light radiated from discharge space 242 into interior space 222, and efficiency in emission of ultraviolet rays to sample water S can be enhanced.

Though outer electrode 262 is arranged around the entire circumference of cladding tube 29 in the embodiment, the outer electrode may be provided in a part thereof.

In the embodiment, inner tube 22 is defined as being composed of a material through which light equal to or shorter than 200 nm passes and outer tube 24 is defined as being composed of a material through which light equal to or shorter than 200 nm is less likely to pass. The material for inner tube 22 and outer tube 24 should only suitably be selected based on the selected type of discharge gas G and auxiliary light source 28. More specifically, the material for inner tube 22 should only be a material through which ultraviolet light derived from discharge gas G passes. The material for outer tube 24 should only be a material through which ultraviolet light derived from discharge gas G is less likely to pass, but at least some of light from auxiliary light source 28 passes.

The inspection apparatus that measures TOC in sample water based on combination of wet oxidation with the use of ultraviolet rays and measurement of the conductivity is described in the embodiment. The present disclosure can be made use of in various inspection apparatuses that measure a subject component contained in sample water with the use of the ultraviolet ray emitter, without being limited.

Figure 8:
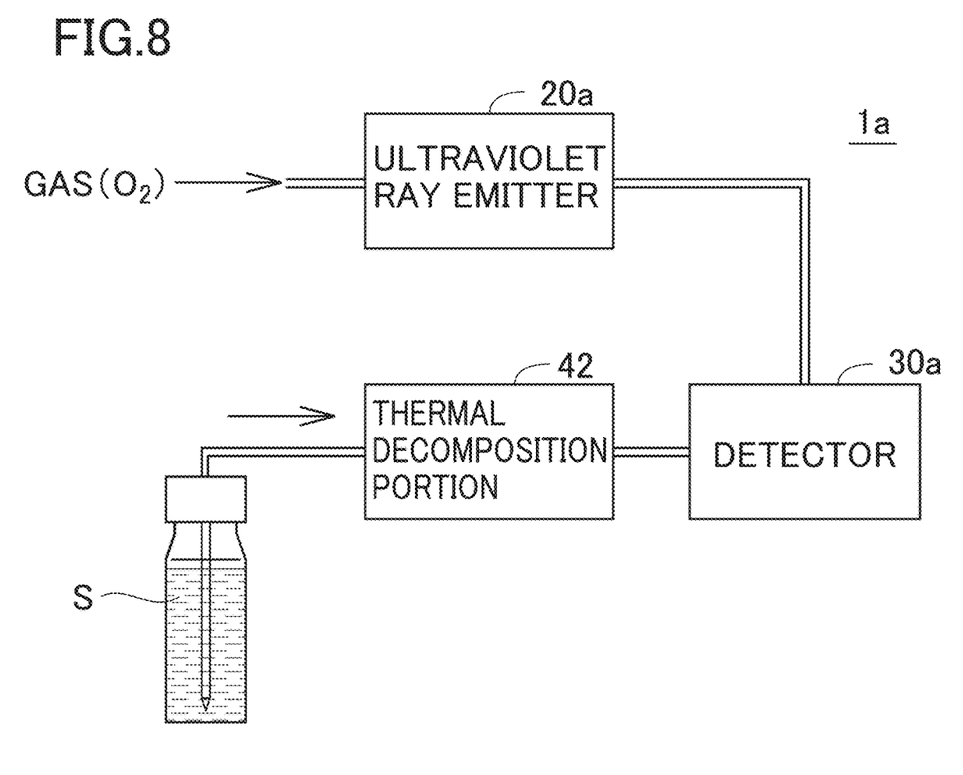
FIG. 8 is a schematic diagram showing an overall configuration of an inspection apparatus 1a according to a modification.

FIG. 8 is a schematic diagram showing an overall configuration of an inspection apparatus 1a according to a modification. Inspection apparatus 1a is an apparatus that measures an amount of nitrogen in sample water with contact thermal decomposition and chemiluminescence. In inspection apparatus 1a, a nitrogen compound in sample water S is thermally decomposed into nitrogen monoxide. Then, ultraviolet rays are emitted to gas containing oxygen to generate ozone and to cause reaction between ozone and nitrogen monoxide, and nitrogen monoxide is converted to nitrogen dioxide. At this time, radiation light is radiated from nitrogen dioxide. Since intensity of radiation light is in proportion to a concentration of nitrogen, inspection apparatus 1a can measure the amount of nitrogen in sample water by detecting light generated at the time when nitrogen monoxide is converted to nitrogen dioxide. Specifically, inspection apparatus 1a includes an ultraviolet ray emitter 20a, a thermal decomposition portion 42, and a detector 30a.

Ultraviolet ray emitter 20a is different from ultraviolet ray emitter 20 according to the embodiment in that gas rather than sample water S passes through the interior space in the inner tube. Gas that passes through the interior space in the inner tube of ultraviolet ray emitter 20a contains at least oxygen. Ultraviolet ray emitter 20a is merely different from ultraviolet ray emitter 20 in that the sample that passes through the interior space in the inner tube is gas rather than a liquid, and they are common in purpose of use of irradiation of a sample that passes through the interior space in the inner tube with ultraviolet rays and structure. Therefore, detailed description of ultraviolet ray emitter 20a will not be provided because it is the same as that for ultraviolet ray emitter 20.

Thermal decomposition portion 42 thermally decomposes a nitrogen compound in sample water S to convert the nitrogen compound to nitrogen monoxide. Though not shown, thermal decomposition portion 42 is provided with a catalyst and oxidizes sample water S injected together with carrier gas. As a result of oxidation of sample water S, the nitrogen compound in sample water S is converted to nitrogen monoxide. Though not shown, thermal decomposition portion 42 includes a dehumidifier that removes moisture in thermally decomposed carrier gas.

Carrier gas thermally decomposed in thermal decomposition portion 42 and ozone generated in ultraviolet ray emitter 20a are introduced into detector 30a. As carrier gas and ozone are introduced into detector 30a, nitrogen monoxide in carrier gas and ozone react with each other to be nitrogen dioxide excited to a metastable state. Nitrogen dioxide excited to the metastable state emits light at the time when it becomes nitrogen dioxide in a stable state.

Detector 30a detects a component contained in sample water treated with gas irradiated with ultraviolet rays. More specifically, in the present embodiment, detector 30a detects light radiated from nitrogen dioxide. More specifically, detector 30a detects light from 590 nm to 2500 nm.

As set forth above, inspection apparatus 1a can make use of the ultraviolet ray emitter described in the embodiment as the apparatus that generates ozone. Inspection apparatus 1a includes a detector in accordance with an object to be detected.

Aspects

The embodiment described above is understood by a person skilled in the art as specific examples of aspects below.

(Clause 1) An inspection apparatus that inspects sample water according to one aspect includes an ultraviolet ray emitter and a detector that detects a subject component contained in the sample water. The ultraviolet ray emitter includes an inner tube, an outer tube arranged around the inner tube, the outer tube defining between the outer tube and the inner tube, a discharge space where discharge gas is sealed, a pair of electrodes that causes discharge in the discharge space, and an auxiliary light source that assists excitation of the discharge gas by emitting light to the discharge gas from the outside of the outer tube. The auxiliary light source can emit light longer in wavelength than ultraviolet light generated by excitation of the discharge gas. The outer tube is less likely to allow passage therethrough of the ultraviolet light than the inner tube but allows passage therethrough of light having the wavelength emitted from the auxiliary light source.

According to the inspection apparatus described in Clause 1, ultraviolet light generated by excitation of discharge gas is less likely to be emitted from the inside of the discharge space toward the outside of the outer tube but light from the auxiliary light source that assists excitation of discharge gas is emitted from the outside of the outer tube into the discharge space. Therefore, the inspection apparatus described in Clause 1 can solve the problem caused by ultraviolet rays derived from discharge gas while it assists excitation of discharge gas.

(Clause 2) In the inspection apparatus described in Clause 1, the ultraviolet ray emitter emits ultraviolet rays to the sample water that passes through an interior space in the inner tube. The detector detects a conductivity of the sample water irradiated with the ultraviolet rays.

According to the inspection apparatus described in Clause 2, TOC in sample water can be measured based on combination of wet oxidation and measurement of the conductivity.

(Clause 3) In the inspection apparatus described in Clause 1, the ultraviolet ray emitter emits the ultraviolet rays to gas that passes through an interior space in the inner tube. The detector detects the subject component contained in the sample water treated with the gas irradiated with the ultraviolet rays.

According to the inspection apparatus described in Clause 3, inspection by treatment of sample water with gas irradiated with ultraviolet rays can be conducted.

(Clause 4) In the inspection apparatus described in Clause 3, the gas contains at least oxygen. The ultraviolet ray emitter generates ozone that oxidizes nitrogen monoxide to nitrogen dioxide by emitting the ultraviolet light to the gas. The detector detects light radiated from nitrogen dioxide.

According to the inspection apparatus described in Clause 4, a total amount of nitrogen in sample water can be measured with contact thermal decomposition and chemiluminescence.

(Clause 5) In the inspection apparatus described in any one of Clauses 1 to 4, the auxiliary light source is arranged in proximity around the outer tube.

According to the inspection apparatus described in Clause 5, the ultraviolet ray emitter can be reduced in size.

(Clause 6) In the inspection apparatus described in any one of Clauses 1 to 5, the pair of electrodes includes an outer electrode arranged on an outer circumference of the outer tube and an inner electrode arranged on a side of the inner tube relative to the outer electrode. The outer electrode is provided with an opening. The auxiliary light source is arranged in the opening.

According to the inspection apparatus described in Clause 6, the ultraviolet ray emitter can be reduced in size.

(Clause 7) The inspection apparatus described in any one of Clauses 1 to 5 further includes a cladding tube arranged around the outer tube. The pair of electrodes includes an outer electrode arranged on an outer circumference of the cladding tube and an inner electrode arranged between the cladding tube and the outer tube.

According to the inspection apparatus described in Clause 7, by providing the outer electrode and the inner electrode on the outside, there is nothing to block ultraviolet light radiated from the discharge space into the interior space, and efficiency of emission of ultraviolet light to the sample water can be enhanced.

(Clause 8) In the inspection apparatus described in Clause 7, the cladding tube and the outer tube are composed of members identical in property.

According to the inspection apparatus described in Clause 8, welding between the cladding tube and the appearance can be facilitated.

(Clause 9) In the inspection apparatus described in any one of Clauses 1 to 8, the ultraviolet light is light having a wavelength equal to or shorter than 200 nm.

According to the inspection apparatus described in Clause 9, the problem caused by ultraviolet rays derived from discharge gas can be solved while excitation of discharge gas is assisted.

The embodiment disclosed herein is also intended to be carried out as being combined as appropriate within the technically consistent scope. It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 1, 1a inspection apparatus; 10 liquid sending portion; 12 vial; 20, 20a ultraviolet ray emitter; 22 inner tube; 24 outer tube; 26 electrode; 28 auxiliary light source; 29 cladding tube; 30, 30a detector; 42 thermal decomposition portion; 222 interior space; 241, 243 end surface; 242 discharge space; 262 outer electrode; 264 inner electrode; 266 opening

The invention claimed is:

1. An inspection apparatus that inspects sample water, the inspection apparatus comprising:
an ultraviolet ray emitter; and
a detector that detects a subject component contained in the sample water, wherein
the ultraviolet ray emitter includes:
an inner tube,
an outer tube arranged around the inner tube, the outer tube defining between the outer tube and the inner tube, a discharge space where discharge gas is sealed,
a pair of electrodes that causes discharge in the discharge space, and
an auxiliary light source that assists excitation of the discharge gas by emitting light to the discharge space from outside of the outer tube,
the auxiliary light source emits light longer in wavelength than ultraviolet light generated by excitation of the discharge gas, wherein
the outer tube is composed of a material that is configured to pass less of the ultraviolet light than a material of the inner tube, but allows passage of light having the wavelength emitted from the auxiliary light source.

2. The inspection apparatus according to claim 1, wherein
the ultraviolet ray emitter emits the ultraviolet light to the sample water that passes through an interior space in the inner tube, and
the detector detects a conductivity of the sample water irradiated with the ultraviolet light.

3. The inspection apparatus according to claim 1, wherein
the ultraviolet ray emitter emits the ultraviolet light to gas that passes through an interior space in the inner tube, and
the detector detects the subject component contained in the sample water treated with the gas irradiated with the ultraviolet light.

4. The inspection apparatus according to claim 3, wherein
the gas contains at least oxygen,
the ultraviolet ray emitter generates ozone that oxidizes nitrogen monoxide to nitrogen dioxide by emitting the ultraviolet light to the gas, and
the detector detects light radiated from nitrogen dioxide.

5. The inspection apparatus according to claim 1, wherein
the auxiliary light source is arranged around the outer tube.

6. The inspection apparatus according to claim 1, wherein
the pair of electrodes includes an outer electrode arranged on an outer circumference of the outer tube and an inner electrode arranged on a side of the inner tube relative to the outer electrode,
the outer electrode is provided with an opening, and
the auxiliary light source is arranged in the opening.

7. The inspection apparatus according to claim 1, wherein
the ultraviolet ray emitter further includes a cladding tube arranged around the outer tube, and
the pair of electrodes includes an outer electrode arranged on an outer circumference of the cladding tube and an inner electrode arranged between the cladding tube and the outer tube.

8. The inspection apparatus according to claim 7, wherein
the cladding tube and the outer tube are composed of a same material.

9. The inspection apparatus according to claim 1, wherein
the ultraviolet light is light having a wavelength equal to or shorter than 200 nm.

10. The inspection apparatus according to claim 1, wherein
the outer tube is composed of quartz glass containing an impurity and having a lattice defect.

11. The inspection apparatus according to claim 1, wherein
the outer tube is located between the discharge space and the auxiliary light source.

12. The inspection apparatus according to claim 1, wherein
the ultraviolet ray emitter further includes a cladding tube arranged around the outer tube, and
the cladding tube is located between the outer tube and the auxiliary light source.

* * * * *